United States Patent
Wakita et al.

(10) Patent No.: US 7,410,930 B2
(45) Date of Patent: Aug. 12, 2008

(54) RECOVERING CATALYST AND CARRIER BY EXFOLIATING OVERCOAT LAYER ON THE SURFACE OF A CATALYST LAYER

(75) Inventors: Hidenobu Wakita, Yawata (JP); Kiyoshi Taguchi, Osaka (JP); Seiji Fujihara, Amagasaki (JP); Kunihiro Ukai, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 759 days.

(21) Appl. No.: 10/527,058

(22) PCT Filed: Mar. 9, 2004

(86) PCT No.: PCT/JP2004/003004

§ 371 (c)(1),
(2), (4) Date: Mar. 9, 2005

(87) PCT Pub. No.: WO2004/080596

PCT Pub. Date: Sep. 23, 2004

(65) Prior Publication Data

US 2006/0084572 A1 Apr. 20, 2006

(30) Foreign Application Priority Data

Mar. 10, 2003 (JP) .............................. 2003-063289

(51) Int. Cl.
*C01B 21/00* (2006.01)

(52) U.S. Cl. .................. 502/300; 502/349; 502/439; 423/22; 423/23; 427/384; 427/402

(58) Field of Classification Search .................... 423/22, 423/23; 502/300, 349; 427/384, 402
See application file for complete search history.

(56) References Cited

U.S. PATENT DOCUMENTS

| 4,532,228 | A | * | 7/1985 | Golino et al. ............... 502/261 |
| 5,854,161 | A | * | 12/1998 | Ichiki et al. .................. 502/41 |
| 6,896,857 | B2 | * | 5/2005 | Nakamura et al. ........ 423/213.5 |

FOREIGN PATENT DOCUMENTS

| JP | 03154640 | 7/1991 |
| JP | 11028367 | 2/1999 |
| JP | 11158563 | 6/1999 |
| JP | 2002186862 | 7/2002 |

OTHER PUBLICATIONS

PCT International Search Report dated May 25, 2004.
"Technology on Recovery and Recycle of Catalyst for Motor Vehicles," JETI, vol. 46, No. 5 (1998), pp. 56-58 with English translation pp. 1-5.

* cited by examiner

*Primary Examiner*—Steven Bos
(74) *Attorney, Agent, or Firm*—Dickinson Wright, PLLC

(57) ABSTRACT

The present invention is a method for recovering a catalyst from a catalyst body comprising a carrier having a catalyst layer formed on at least a part of the surface thereof, which comprises (a) a step of forming an overcoat layer on the surface of the catalyst layer, and (b) a step of allowing the catalyst body having the overcoat layer formed thereon to stand under the condition to result in a difference in expansibility or contractility exhibited by the overcoat layer from that exhibited by the carrier, wherein exfoliation of the catalyst layer from the carrier is permitted by means of the resulting difference in expansibility or contractility under the condition.

15 Claims, 1 Drawing Sheet

RECOVERING CATALYST AND CARRIER BY EXFOLIATING OVERCOAT LAYER ON THE SURFACE OF A CATALYST LAYER

TECHNICAL FIELD

The present invention relates to a method for recovering a catalyst supported on a carrier formed from ceramics or a metal, and a catalyst recovered by the method for recovering. Further, the present invention also relates to a method for recovering a carrier from a carrier having a catalyst layer formed thereon, and a carrier recovered by the method.

RELATED ART

For many of emission gas purification catalyst bodies for automobile use and hydrogen producing catalyst bodies for fuel cell use, honeycomb bodies have been used as a carrier for preventing excessive back pressure against an upstream part of the catalyst (engine or steam reforming catalyst part). The honeycomb body is formed by extrusion of a ceramics material such as cordierite or the like, or subjecting a metal plate made from a Fe—Cr—Al based metal to corrugate processing. Usually, a catalyst layer is formed on such a carrier to give a thickness of from several microns to several dozen of microns. Although it may depend on applications of the reaction, the catalyst layer usually comprises particles (diameter of 1 to 5 nm) of a noble metal (such as Pt, Pd, Rh or the like), which is a metal catalyst, supported on a carrier having a large specific surface area ($CeO_2$ supported alumina, alumina, ceria-zirconia, titania, zirconia, silica or the like), and a binder (alumina, zirconia or the like).

Used catalyst bodies can be subjected to waste disposal as they are or disposed following scrapping. However, because noble metals are expensive, the noble metals after use are desirably recovered, and recycled.

When a ceramics carrier is used, the noble metal is recovered through undergoing the steps of such as dissolution, solid-liquid separation and the like. Suzuki et al., (for example, see, Masahito Suzuki, JETI, 46, 56 (1998)) reported that such catalyst bodies are subjected to the steps of: (1) grinding for the determination of the noble metal content, followed by sampling first, (2) separating the noble metal from the ceramics followed by concentration, and (3) separating the noble metal one another to improve the purity of the noble metal.

There exist wet processes and dry processes as the step of separating the noble metal from the ceramics. In the wet process, the noble metal is dissolved in an acid solution such as hydrochloric acid and an oxidizing agent such as nitric acid, subjected to solid-liquid separation to separate from the ceramics that is a carrier, and thereafter, concentrated by evaporation, reduction, ion exchange or the like. In the dry process, a base metal such as iron, copper, nickel or the like as a noble metal collecting material, a flux and a reducing agent as well as the waste catalyst are mixed and melted to concentrate the noble metal into the base metal, accompanied by slagging of the ceramics to permit the separation, and thereafter, separation of the noble metal from the base metal is carried out by an electrolytic method, wet dissolution method, dry method or the like.

In case of a metal carrier, the grinding can not be carried out so easily as in the case of the ceramics, therefore, a method in which the catalyst is recovered after exfoliating the catalyst layer from the carrier was proposed. Examples of the method include e.g., a method in which the catalyst is recovered after exfoliating the catalyst layer from the carrier by heating in an aqueous nitric acid solution or in an aqueous hydrogen peroxide solution (for example, see, JP-A-H3-154640), a method in which the catalyst is recovered after exfoliating the catalyst layer from the carrier by spraying and injecting water into the heated metal carrier (for example, see, JP-A-H11-158563), a method in which the catalyst is recovered after exfoliating the catalyst layer from the carrier by sand blasting using iron powder as the sandstone (for example, see, JP-A-H5-212297), a method in which the catalyst is recovered after exfoliating the catalyst layer from the carrier by projecting the air containing a projecting agent (for example, see, JP-A-H6-170247), and the like.

However, the conventional methods involved the problems as described below.

Conventionally, according to catalyst bodies in which a ceramics carrier is used, steps of grinding the catalyst body and separating the catalyst layer from the ceramics were required, which raised factors to reduce the recovery rate. In addition, because the ceramics is mixed in the catalyst layer by grinding, it was difficult to utilize the ground product again as a catalyst layer without recovering the noble metal alone. Furthermore, because the carrier is broken, recycling of the carrier was impossible.

According to catalyst bodies in which a metal carrier is used, the catalyst layer is recovered following exfoliation from the metal carrier, as the case may be, however, the conventional method involves risk in manipulation such as use of an acid or the like, and requires a special equipment for e.g., exfoliating the catalyst layer with high-pressure water flow or sand blast. Additionally, there also involved problems in connection with contamination of materials including a chemical such as hydrogen peroxide and sandstone for the sand blast, which are completely different from the catalyst layer, resulting in need of separation or decomposition of such materials following the exfoliation.

DISCLOSURE OF THE INVENTION

An object of the present invention is to provide a method for recovering a catalyst in a state capable of being recycled without subjecting to a complicated purification step, which can achieve a sufficient recovery rate, upon recovery of the catalyst from a catalyst body with a catalyst layer being supported on a carrier formed from ceramics, a metal or the like. Moreover, another object of the invention is to provide a method for recovering in which the catalyst can be recovered without additionally destroying the carrier, and without use of a special apparatus.

In order to achieve the aforementioned object, an aspect of the present invention is a method for recovering a catalyst from a catalyst body comprising a carrier having a catalyst layer formed on at least a part of the surface thereof, the method comprising (a) a step of forming an overcoat layer on the surface of the catalyst layer, and (b) a step of allowing the catalyst body having the overcoat layer formed thereon to stand under the condition to result in a difference in expansibility or contractility exhibited by the overcoat layer from that exhibited by the carrier, wherein exfoliation of the catalyst layer from the carrier is permitted by means of the resulting difference in expansibility or contractility under the condition.

According to the method described above, the expansibility or contractility is different between the carrier and the overcoat layer formed on the catalyst layer, therefore, the catalyst layer can be exfoliated from the carrier when the catalyst body is allowed to stand under the aforementioned condition, through utilizing the difference in behaviors between the overcoat layer and the carrier as an exfoliation force generated between the carrier and the catalyst layer. The difference in expansibility or contractility referred to herein involves any instance resulting from: the case in which one expands while other contracts; the case in which both expand but the extent of the expansibility being different; and the case in which both contract but the extent of the contractility being different.

According to the method described above, preferably, the overcoat layer is formed by coating the surface of the catalyst layer in the step (a) with an overcoat agent having a hardening capability, and the condition in the step (b) is set to be a condition in which the overcoat layer is hardened. When the overcoat layer is hardened, an adhesion force to the catalyst layer is elevated, thereby readily achieving the exfoliation in the step (b) on behalf of the force that acts smoothly between the carrier and the catalyst layer, which force being generated by the difference in behaviors between the overcoat layer and the carrier.

Additionally, another aspect of the present invention is a method for recovering a catalyst from a catalyst body comprising a carrier having a catalyst layer formed on at least a part of the surface thereof, the method comprising (a) a step of forming an overcoat layer on the surface of the catalyst layer with an overcoat agent having a hardening capability, and (b) a step of allowing the catalyst body having the overcoat layer formed thereon to stand under the condition in which the overcoat layer is hardened, wherein exfoliation of the catalyst layer from the carrier is permitted by means of the hardening.

In the aforementioned method, an overcoat agent which is hardened through e.g., heating, air blowing or leaving to stand at room temperature may be used. In this instance, the overcoat layer can be hardened by a simple means.

As the hardening component in the overcoat agent, an inorganic binder may be used. The inorganic binder may be selected from, for example, the group consisting of clay, cement, silica sol, alumina sol, titania sol and any combinations thereof.

Moreover, an organic compound may be used as the hardening component in the overcoat agent. As the organic compound, for example, a polymer may be used such as any one of polysaccharides, thermosetting resins and the like. Among the polysaccharides, cellulose can be particularly preferably used. Cellulose is hardened by heating, and exhibits a high adhesion force to the catalyst layer.

When an organic compound is used as a hardening component of the overcoat agent, preferably, a step (c) is further included in which the overcoat layer formed on the surface of the catalyst layer is heated to allow combustion of the organic compound, following the step (b). By way of undergoing the step (c), the organic compound not showing catalysis is eliminated, therefore, thus recovered catalyst exhibits a high catalytic activity.

Additionally, according to the present invention, when the catalyst layer contains a metal oxide in the aforementioned method, the overcoat agent preferably contains the identical metal oxide. Because the same metal oxide as that in the catalyst layer is included in the overcoat layer according to the aforementioned method, the adhesion force between the overcoat layer and the catalyst layer is extremely elevated. Thus, the catalyst layer is readily exfoliated from the carrier, since a force is liable to act on the boundary between the catalyst layer and the carrier.

In the aforementioned method, examples of the metal oxide which may be used include e.g., zirconium oxide.

The present invention is preferably applied when a catalyst is recovered from a catalyst body including a noble metal in the catalyst layer, because noble metals are so expensive that the cost required for the recovery is far less than the cost for the noble metal, in general.

The aforementioned method may be applied to any one of the cases in which the carrier comprises ceramics, and the cases in which it comprises a metal. In either case, the catalyst is recovered without crushing of the carrier according to the method of the present invention, therefore, the carrier can be also recycled, leading to advantages in terms of the cost.

Furthermore, the catalyst according to the present invention is a catalyst recovered by the aforementioned method for recovering a catalyst.

Also, the catalyst of the present invention is a catalyst including a catalyst recovered by the aforementioned method for recovering a catalyst as a raw material and then milled.

Moreover, still another aspect of the present invention is a method for recovering a carrier from a catalyst body comprising the carrier having a catalyst layer formed on at least a part of the surface thereof, the method comprising (a) a step of forming an overcoat layer on the surface of the catalyst layer with an overcoat agent having a hardening capability, and (b) a step of allowing the catalyst body having the overcoat layer formed thereon to stand under the condition in which the overcoat layer is hardened, wherein exfoliation of the catalyst layer from the carrier is permitted by means of the hardening.

The carrier according to the present invention is a carrier recovered by the aforementioned method for recovering a carrier.

Foregoing object, other object, features, and advantages of the present invention will be apparent from the following detailed description of the preferred embodiments with reference to accompanying drawings.

BEST MODE FOR CARRYING OUT THE INVENTION

Hereinafter, the embodiment of the present invention is explained with reference to drawings.

Figure 1:
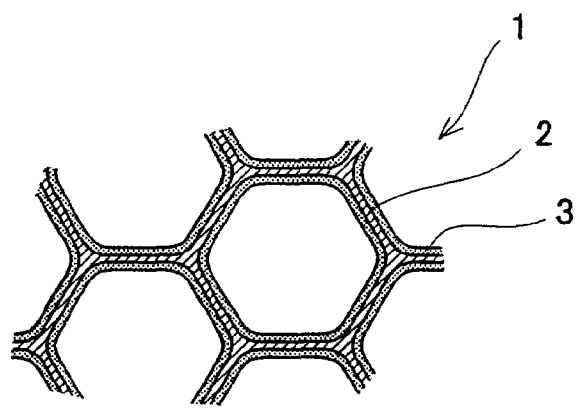
FIG. 1 is a cross sectional view schematically illustrating a part of a catalyst body for use in this embodiment.
Figure 2:
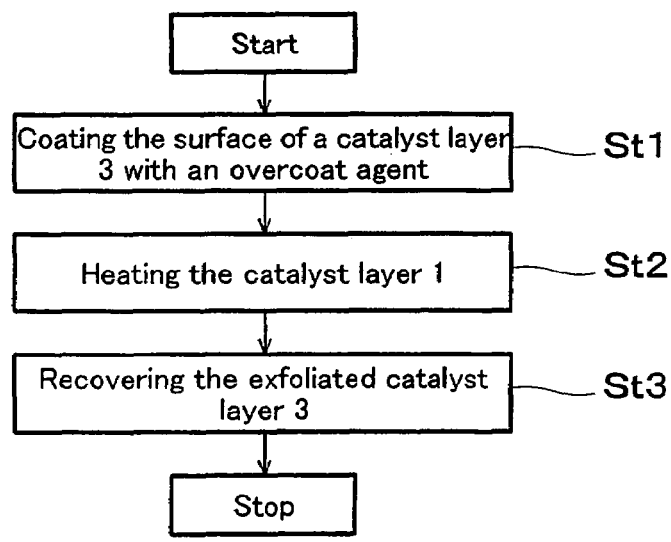
FIG. 2 is a flow chart illustrating a method for recovering a catalyst according to this embodiment.

FIG. 1 is a cross sectional view schematically illustrating a part of a catalyst body for use in this embodiment. FIG. 2 is a flow chart illustrating a method for recovering a catalyst according to this embodiment.

As is shown in FIG. 1, a catalyst body 1 including a catalyst layer 3 formed on the surface of a carrier 2 that is a honeycomb body comprising cordierite ($2MgO.2Al_2O_3.5SiO_2$) or a metal is used first in this embodiment.

As is shown in FIG. 2, according to the method of the recovery according to this embodiment, the surface of the catalyst layer 3 is coated with an overcoat agent in the form of a liquid or slurry (St1). The coating with the overcoat agent is executed by, for example, dipping the catalyst body 1 in the overcoat agent. Further, the shape of the carrier is not limited to the honeycomb shape, but may be, for example, a plate shape or a corrugate shape. When the carrier is in the plate shape, or in other shape which can be applied by spraying or the like, the overcoat agent may be applied onto the surface of the catalyst layer. By coating the overcoat agent, the overcoat layer is formed on the surface of the catalyst layer 3 of the catalyst body 1.

After forming the overcoat layer in the aforementioned step, the catalyst body 1 is heated to harden the overcoat layer (St2). Hardening of the overcoat layer leads to adhension between the catalyst layer 3 and the overcoat layer, accompanied by exfoliation of the catalyst layer 3 from the carrier. Thus exfoliated catalyst layer 3 is recovered, and recycled as a raw material of, for example, a catalyst layer (St3).

According to this embodiment, a material that is hardened by heating, with the hardening accompanied by exfoliation of the catalyst layer 3 from the carrier 2 is used, as the overcoat agent. Preferably, a material which results in a difference in expansibility or contractility exhibited by the overcoat layer from that exhibited by the carrier 2 (hereinafter, the difference is also referred to as difference in behaviors between the overcoat layer and the carrier 2) under the condition to allow hardening is used. When such a material is used, the force generated by the aforementioned difference in behaviors can be brought the boundary of the catalyst layer 3 and the carrier 2 into action, and thus, the catalyst layer 3 can be readily exfoliated from the carrier 2 by the force.

Any material can be used as the overcoat agent even if it is not hardened, as long as it is a material which results in a difference in expansibility or contractility exhibited by the overcoat layer from that exhibited by the carrier 2 under a predetermined condition, and such a difference in behaviors can be utilized for the exfoliation of the catalyst layer 3.

However, use of a material having a hardening capability as the overcoat agent is preferred because the adhesion force between the overcoat layer and the catalyst layer 3 can be elevated, therefore, the aforementioned force generated by the difference in behaviors becomes liable to concentrate to the boundary between the catalyst layer 3 and the carrier 2, thereby facilitating the exfoliation of the catalyst layer 3. The overcoat agent preferably has a greater adhesion force to the catalyst layer 3.

Moreover, the overcoat agent is not limited to the materials that are hardened through heating as described above, but a material which is hardened through, for example, air blowing or leaving to stand at room temperature can be also used. Depending on characteristics of the overcoat agent employed, the catalyst body 1 is allowed to stand under the condition to lead to the exfoliation of the catalyst layer 3 in stead of carrying out the aforementioned heating step. Mechanisms involved in hardening of the overcoat agent through air blowing, leaving to stand at room temperature or the like may be drying, hydration binding or the like.

Thicker overcoat layer is preferred because the force contributing to the exfoliation of the catalyst layer 3 becomes greater.

Examples of the material of the overcoat agent having a hardening capability which may be used include e.g., materials including an inorganic binder. The inorganic binder may be selected from the group consisting of colloids such as silica sol, alumina sol and titania sol, clay based compounds, cement and any combinations thereof. As the cement, an air setting cement such as gypsum (calcium sulfate) may be preferably used. The inorganic binder is used as the overcoat agent following dispersion in a solvent such as water. Silica sol contracts upon gelation by heating with a great degree of contraction, therefore, it is preferably used as an ingredient of the overcoat agent.

Additionally, for example, an overcoat agent including a metal oxide which is identical to the carrier (alumina, silica, zirconia or the like) or the binder included in the catalyst layer 3 may be also used. In this case, the adhesion force between the catalyst layer 3 and the overcoat layer can be elevated, thereby facilitating exfoliation of the catalyst layer 3. For example, when the catalyst layer 3 includes zirconium oxide, the method may involve using zirconia sol as the overcoat agent followed by heating to make the overcoat layer of zirconia, enabling adhesion with a high adhesion force between the overcoat layer and the catalyst layer 3 to allow exfoliation of the catalyst layer 3 from the carrier 2.

In recent years, as catalyst layers of emission gas purification catalyst bodies for automobile use or shift catalyst bodies for fuel cell use, noble metal catalysts having a complex oxide of cerium and zirconium as a carrier have been extensively used. However, when zirconium oxide is included in the carrier, the adhesion force between the catalyst layer 3 and the carrier 2 is poor. Therefore, less force is required for exfoliation of the catalyst layer 3. Thus, the present invention can be effectively applied, particularly in catalyst bodies 1 in which zirconium oxide is used in the catalyst layer 3 as a carrier. For reference, the present invention may be often used when the catalyst layer 3 includes a noble metal, because possible recovery of the noble metal in a simple method is advantageous in terms of cost.

Furthermore, a polymer having a hardening capability may be also used as the principal component in the overcoat agent. In this instance, raw materials having a high catalytic activity can be recovered without undergoing complicated steps, because the polymer is oxidatively degraded when the catalyst layer 3, which was exfoliated in the state where the overcoat layer was adhered thereto, is heated at high temperature, thereby enabling elimination of the overcoat layer. Examples of the polymer which may be used include polysaccharides and thermosetting resins. Specifically, an aqueous solution including a cellulose compound dispersed therein, or a solution of a raw material such as epoxy resin, phenolic resin, unsaturated polyester resin or the like can be used as the overcoat agent.

The catalyst layer 3 exfoliated from the carrier 2 can be recycled as a raw material of a catalyst. Particularly, use of the identical material for the overcoat layer to that of the catalyst layer 3, as well as elimination of the overcoat layer by way of combustion are preferred, in light of possible suppression of deactivation of the catalyst through recovering. Thus recovered catalyst layer 3 can be converted to a catalyst or a catalyst slurry as it stands, or following subjecting to dry mill or wet mill. Accordingly, recycling of the catalyst is facilitated. The carrier 2 after exfoliation of the catalyst layer 3 can be also recycled.

Specific Examples are demonstrated hereinbelow.

EXAMPLE 1

A catalyst body was prepared by forming a thin catalyst layer including 2 wt % $Pt/Ce_{0.5}Zr_{0.5}O_x$ as a catalyst and zirconia as a binder on the surface of a cordierite honeycomb body. Subsequently, this catalyst body was depped in 5 wt % zirconia sol that is an overcoat agent, and thereafter, was calcined at 900° C. for 120 min. After cooling, the catalyst layer supported on the honeycomb body was exfoliated, and acicular catalyst layer having a length of 1 to 5 mm and width of 0.2 to 1 mm was found to drop off from the honeycomb body. In order to further recover the catalyst layer remaining in the honeycomb body, air blow was executed onto the catalyst body. Accordingly, the catalyst within the honeycomb body was almost completely recovered. The cordierite honeycomb body after exfoliation of the catalyst layer was also recovered.

EXAMPLE 2

Similar experiment to that in Example 1 was carried out except that a Fe—Cr—Al based metal honeycomb body in a corrugate shape was used as a honeycomb body in stead of the cordierite honeycomb body in Example 1. As a result, the catalyst layer could be recovered similarly to Example 1. Further, upon air blowing onto the catalyst body, the catalyst remained within the cell of the honeycomb body was almost completely recovered. The metal honeycomb body after exfoliation of the catalyst layer was also recovered.

EXAMPLE 3

A catalyst body was prepared by forming a thin catalyst layer including 2 wt % $Pt/Ce_{0.5}Zr_{0.5}O_x$ as a catalyst and zirconia as a binder on the surface of a Fe—Cr—Al based metal honeycomb body in a corrugate shape in a similar manner to Example 2. Subsequently, this catalyst body was dipped in a 5 wt % aqueous hydroxyethyl cellulose solution that is an overcoat agent, and thereafter, was dried at 150° C. for 6 hrs. As a result, the catalyst layer was exfoliated. Additionally, when the exfoliated catalyst layer was calcined at 900° C. for 120 min, combustion of hydroxyethyl cellulose was ascertained from the weight change.

EXAMPLE 4

A catalyst body was produced using a metal carrier in a plate shape as a carrier. Composition of the catalyst layer, and the method for forming the catalyst layer employed were similar to those in Example 2. The catalyst body was dipped in an unsaturated polyester basic ingredient solution that is an overcoat agent, and thereafter, was calcined at 900° C. for 120 min. According to this step, the catalyst layer was completely exfoliated from the carrier, and in addition, the unsaturated polyester layer was also eliminated.

EXAMPLE 5

A catalyst body was produced using a metal carrier in a plate shape as a carrier. Composition of the catalyst layer, and the method for forming the catalyst layer employed were similar to those in Example 2. Using a slurry including bentonite dispersed in water as an overcoat agent, the catalyst body was dipped in the overcoat agent. Following impregnation of the overcoat agent, the catalyst body was calcined at 600° C. for 120 min. The catalyst later was completely exfoliated from the carrier.

EXAMPLE 6

A catalyst body was produced using a metal carrier in a plate shape as a carrier. Composition of the catalyst layer, and the method for forming the catalyst layer employed were similar to those in Example 2. Using a slurry including gypsum, which is a kind of air setting cement, dispersed in water as an overcoat agent, the catalyst body was dipped in the overcoat agent. Following impregnation of the overcoat agent, the catalyst body was dried by leaving to stand at room temperature (25° C.) for 3 days. After drying, the catalyst later was completely exfoliated from the carrier.

EXAMPLE 7

A catalyst body was produced using a metal carrier in a plate shape as a carrier. Composition of the catalyst layer, and the method for forming the catalyst layer employed were similar to those in Example 2. Using silica sol, alumina sol and titania sol, respectively, as an overcoat agent, three kinds of catalyst bodies were prepared dipped in the overcoat agent. After drying each catalyst body by leaving to stand at room temperature (25° C.) for 3 days, it was calcined at 500° C. for 120 min. The process of dipping in the overcoat agent and the process of calcining as described above were repeated until the catalyst layer was exfoliated.

The catalyst later was exfoliated from the carrier when the repetitive process was conducted twice for the catalyst body in which the silica sol was used as an overcoat agent, four times for the catalyst body in which the alumina sol was used, and four times for the catalyst body in which titania sol was used.

EXAMPLE 8

A catalyst layer ($Pt/Ce_{0.5}Zr_{0.5}O_x$) exfoliated according to a similar process to that in Example 1 except that the calcination temperature was 650° C. was mixed with alumina sol and water, and milled with a zirconia ball to produce a catalyst slurry. Using this slurry, a catalyst layer was formed on the metal honeycomb body recovered in Example 2 to produce a catalyst body. When an oxidation of carbon monoxide was performed using this catalyst body, it was ascertained that the oxidation was caused at a temperature of the catalyst of 200° C.

As described hereinabove, through the use of the method for recovering a catalyst according to the present invention, the catalyst layer can be exfoliated from the carrier such as a honeycomb body in a simple method without the need for a special apparatus and the like, enabling recovery at a high recovery rate. Thus recovered catalyst can be used as a raw material for the catalyst layer without carrying out a particular separation process. In addition, the carrier after exfoliation of the catalyst layer can be also recovered, and recycled.

From the description hereinabove, many improvements and other embodiments of the present invention will be apparent to persons skilled in the art. Therefore, the foregoing description should be construed as merely an illustrative example, which was provided for the purpose of teaching the best embodiment for carrying out the present invention to the persons skilled in the art. Details of the structure and/or function can be substantially altered without departing from the spirit of the present invention.

INDUSTRIAL APPLICABILITY

The method for recovering a catalyst according to the present invention is useful in recovering a catalyst from a catalyst body for use in emission gas purification for automobile use or for fuel cell use.

What is claimed is:

1. A method for recovering a catalyst from a catalyst body comprising a carrier having a catalyst layer formed on at least a part of the surface thereof, said method comprising:
    (a) a step of forming an overcoat layer on the surface of said catalyst layer, and
    (b) a step of allowing said catalyst body having said overcoat layer formed thereon to stand under the condition to result in a difference in expansibility or contractility exhibited by said overcoat layer from that exhibited by said carrier,
    wherein exfoliation of said catalyst layer from said carrier is permitted by means of the resulting difference in expansibility or contractility under the condition.

2. The method for recovering a catalyst according to claim 1,
wherein said overcoat layer is formed by coating the surface of said catalyst layer with an overcoat agent having a hardening capability in said step (a), and
said condition in said step (b) is set to be a condition in which said overcoat layer is hardened.

3. A method for recovering a catalyst from a catalyst body comprising a carrier having a catalyst layer formed on at least a part of the surface thereof, said method comprising:
(a) a step of forming an overcoat layer on the surface of said catalyst layer with an overcoat agent having a hardening capability, and
(b) a step of allowing said catalyst body having said overcoat layer formed thereon to stand under the condition in which said overcoat layer is hardened,
wherein exfoliation of said catalyst layer from said carrier is permitted by means of said hardening.

4. The method for recovering a catalyst according to claim 3 wherein said condition in said step (b) is heating, air blowing or leaving to stand at room temperature.

5. The method for recovering a catalyst according to claim 3 wherein said overcoat agent comprises an inorganic binder.

6. The method for recovering a catalyst according to claim 5 wherein said inorganic binder is selected from the group consisting of clay, cement, silica sol, alumina sol, titania sol and any combinations thereof.

7. The method for recovering a catalyst according to claim 3 wherein said overcoat agent comprises an organic compound.

8. The method for recovering a catalyst according to claim 7 wherein said organic compound is a polymer.

9. The method for recovering a catalyst according to claim 8 wherein said polymer is cellulose.

10. The method for recovering a catalyst according to claim 7 further comprising a step (c) of heating said overcoat layer formed on the surface of said catalyst layer to allow combustion of said organic compound, following the step (b).

11. The method for recovering a catalyst according to claim 3 wherein said catalyst layer contains a metal oxide, and said overcoat agent contains said metal oxide.

12. The method for recovering a catalyst according to claim 11 wherein said metal oxide is zirconium oxide.

13. The method for recovering a catalyst according to claim 3 wherein said catalyst layer comprises a noble metal.

14. The method for recovering a catalyst according to claim 3 wherein said carrier comprises ceramics or a metal.

15. A method for recovering a carrier from a catalyst body comprising said carrier having a catalyst layer formed on at least a part of the surface thereof, said method comprising:
(a) a step of forming an overcoat layer on the surface of said catalyst layer with an overcoat agent having a hardening capability, and
(b) a step of allowing said catalyst body having said overcoat layer formed thereon to stand under the condition in which said overcoat layer is hardened,
wherein exfoliation of said catalyst layer from said carrier is permitted by means of said hardening.

* * * * *

UNITED STATES PATENT AND TRADEMARK OFFICE
CERTIFICATE OF CORRECTION

PATENT NO. : 7,410,930 B2
APPLICATION NO. : 10/527058
DATED : August 12, 2008
INVENTOR(S) : Hidenobu Wakita et al.

It is certified that error appears in the above-identified patent and that said Letters Patent is hereby corrected as shown below:

On the title page: Item (54) reads: RECOVERING CATALYST AND CARRIER BY EXFOLIATING OVERCOAT LAYER ON THE SURFACE OF A CATALYST LAYER and should read:

(54) METHOD FOR RECOVERING CATALYST AND CATALYST RECOVERED BY THE METHOD FOR RECOVERING, METHOD FOR RECOVERING CARRIER AND CARRIER RECOVERED BY THE METHOD FOR RECOVERING

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO.        : 7,410,930 B2                                    Page 1 of 1
APPLICATION NO. : 10/527058
DATED              : August 12, 2008
INVENTOR(S)       : Hidenobu Wakita et al.

It is certified that error appears in the above-identified patent and that said Letters Patent is hereby corrected as shown below:

On the title page: Item (54) and at Column 1, lines 1-3 reads: RECOVERING CATALYST AND CARRIER BY EXFOLIATING OVERCOAT LAYER ON THE SURFACE OF A CATALYST LAYER and should read:

METHOD FOR RECOVERING CATALYST AND CATALYST RECOVERED BY THE METHOD FOR RECOVERING, METHOD FOR RECOVERING CARRIER AND CARRIER RECOVERED BY THE METHOD FOR RECOVERING

This certificate supersedes the Certificate of Correction issued February 9, 2010.

Signed and Sealed this

Ninth Day of March, 2010

David J. Kappos
*Director of the United States Patent and Trademark Office*